United States Patent [19]
Beyer

[11] Patent Number: 5,915,796
[45] Date of Patent: Jun. 29, 1999

[54] COMPOSITE FIBER SPOKE VEHICULAR WHEEL AND METHOD OF MAKING THE SAME

[75] Inventor: Albert Arthur Beyer, Edmonton, Canada

[73] Assignee: Dymanic Composites Inc., Alberta, Canada

[21] Appl. No.: 08/848,153

[22] Filed: Apr. 29, 1997

[51] Int. Cl.$^6$ ....................................................... B60B 1/14
[52] U.S. Cl. ........................... 301/59; 301/64.7; 301/104; 264/640; 264/DIG. 259; 264/DIG. 273
[58] Field of Search ................................. 301/54, 55, 56, 301/57, 59, 61, 64.7, 104, 110.5; 264/640, 641, 642, DIG. 241, DIG. 259, DIG. 272.13, DIG. 273

[56] References Cited

U.S. PATENT DOCUMENTS

| | | | |
|---|---|---|---|
| 404,657 | 6/1889 | Root | 301/55 |
| 709,375 | 9/1902 | Thayer | 301/57 |
| 1,184,852 | 5/1916 | Hawkinson | 301/57 |
| 1,492,850 | 5/1924 | Hubbard | 301/57 |
| 4,595,242 | 6/1986 | Wehmeyer | 301/64.7 |
| 5,104,199 | 4/1992 | Schlanger | 301/64.2 |
| 5,110,190 | 5/1992 | Johnson | 301/104 X |
| 5,452,945 | 9/1995 | Schlanger | 301/58 |
| 5,540,485 | 7/1996 | Enders | 301/104 |
| 5,549,360 | 8/1996 | Lipeles | 301/64.7 |

FOREIGN PATENT DOCUMENTS

| | | | |
|---|---|---|---|
| 532435 | 2/1922 | France | 301/56 |
| 697222 | 1/1931 | France | 301/57 |
| 17841 | 1/1913 | Germany | 301/57 |
| 15154 | 6/1914 | United Kingdom | 301/55 |
| 443877 | 3/1936 | United Kingdom | 301/57 |

*Primary Examiner*—Russell D. Stormer
*Attorney, Agent, or Firm*—Antony R. Lambert

[57] ABSTRACT

A composite fiber spoke vehicular wheel and a method of making the same. The wheel has a hub, a rim, and composite fiber strip spokes. Composite fiber strip spokes wrap around a portion of hub, with opposed ends of composite fiber strip spokes secured to rim.

12 Claims, 4 Drawing Sheets

COMPOSITE FIBER SPOKE VEHICULAR WHEEL AND METHOD OF MAKING THE SAME

FIELD OF THE INVENTION

The present invention relates to a composite fiber spoke vehicular wheel and, in particular, a bicycle wheel.

BACKGROUND OF THE INVENTION

U.S. Pat. No. 5,104,199 which issued to Schlanger in 1992 describes the history of the development of composite fiber vehicular wheels. Composite fiber bicycle wheels were introduced in an attempt to reduce aerodynamic drag. The early versions of these wheels were in the form of solid discs. They were fabricated by wrapping fiber reinforced cloth around a bladder. This assembly was then treated with resin and placed within a mold. Heat and pressure was applied within the mold to cure the resin.

The Schlanger reference notes that these disc wheels compromised rider stability and safety, as they were susceptible to cross winds. The Schlanger reference, therefore, proposes an alternative construction that has spokes. The Schlanger wheel has two integrally joined wheel portions with a hub retained between the wheel portions. The wheel has an outside circular member which forms an enclosed continuous, circumferential hollow annulus for supporting an annular rim. Spokes extend between the hub and the annular rim.

A disadvantage of the Schlanger reference is that it relies upon a structural adhesive to maintain the hub in position. There have been numerous failures at the hub as a result of the torsional load upon the wheel exceeding the holding ability of the structural adhesive. U.S. Pat. No. 5,452,945 which issued in 1995 to Schlanger discloses an alternative means to structural adhesive for securing the hub in position. An circular member is integrally formed with and encircles the hub. The spokes are secured to the circular member by multiple threaded fasteners that extend through the circular member and are held in position by nuts.

SUMMARY OF THE INVENTION

What is required is an alternative composite fiber spoke vehicular wheel and a method of making the same.

According to one aspect of the present invention there is provided a method of making a composite fiber spoke vehicular wheel: Firstly, provide a hub, a rim, and some composite fiber strips. The composite fiber strips each having opposed ends. Secondly, wrap each strip around a portion of the hub and secure the opposed ends to the rim. Cure the composite fiber strips, whereby the composite fiber strips serve as spokes.

According to another aspect of the present invention there is provided a composite fiber spoke vehicular wheel which includes a hub, a rim, and composite fiber strip spokes. Composite fiber strip spokes are wrapped around a portion of the hub with opposed ends of the composite fiber strip spokes secured to the rim.

The wrapping of the composite fiber strips around the hub, as described above, is an inexpensive manner of avoiding hub failure. The strips may extend either radially or tangentially from the hub.

Although beneficial results may be obtained through the use of the invention, as described above, even more beneficial results may be obtained when the hub has end flanges with a plurality of slots. This enables the composite fiber strips to be extended through the slots and then wrapped around a portion of the hub.

Although beneficial results may be obtained through the use of the invention, as described above, there are bonding and differential expansion problems associated with using dissimilar materials. Even more beneficial results may, therefore, be obtained when the rim and hub are made of composite fiber and resin.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
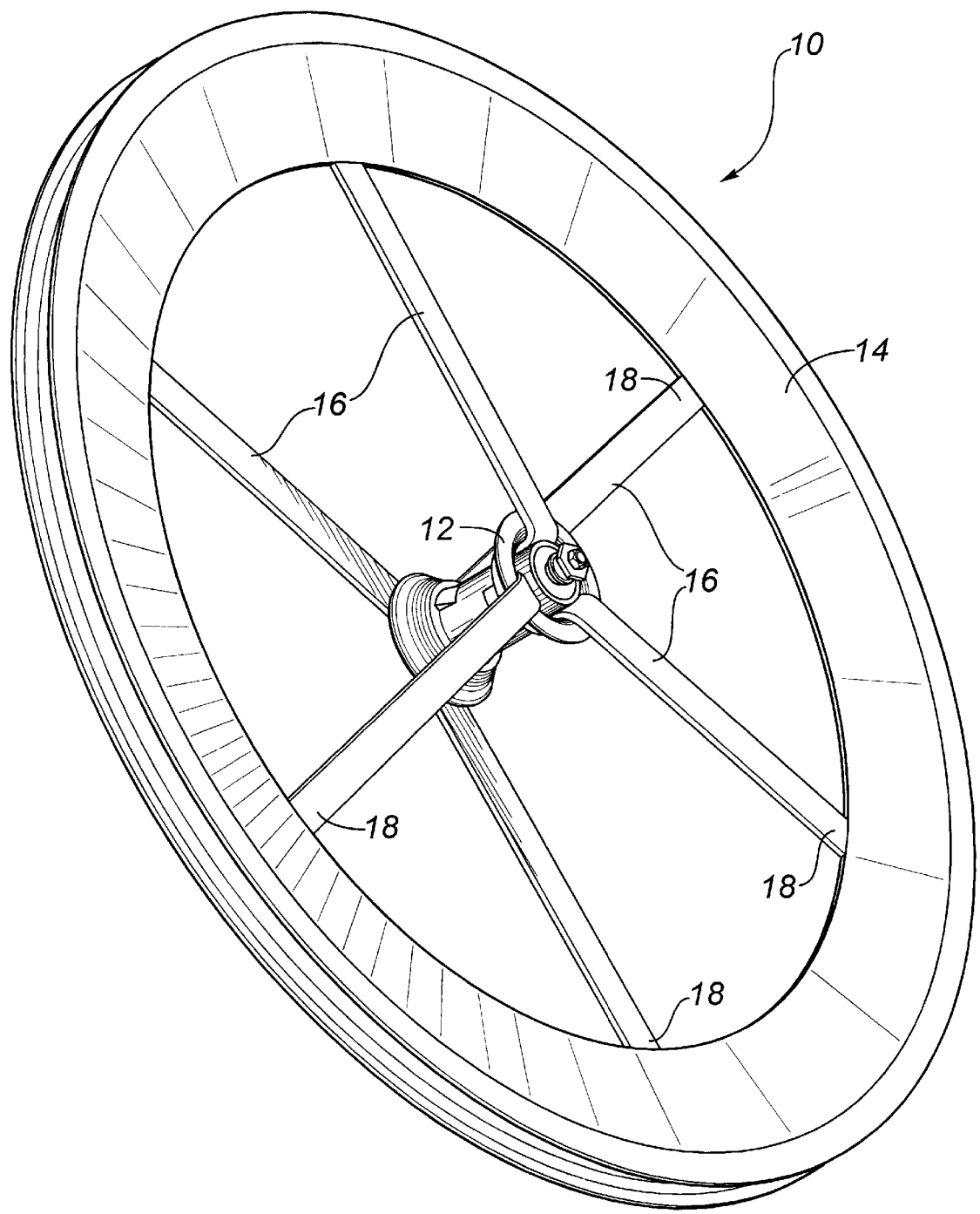
FIG. 1 is a composite fiber spoke vehicular wheel constructed in accordance with the teachings of the present invention.

The preferred embodiment, a composite fiber spoke vehicular wheel generally identified by reference numeral 10, will now be described with reference to FIGS. 1 through 5.

Referring to FIG. 1, composite fiber spoke vehicular wheel 10 has a hub 12, a rim 14, and composite fiber strip spokes 16. Composite fiber strip spokes 16 wrap around a portion of hub 12, as will hereinafter be further described, with opposed ends 18 of composite fiber strip spokes 16 secured to rim 14.

Figure 2:
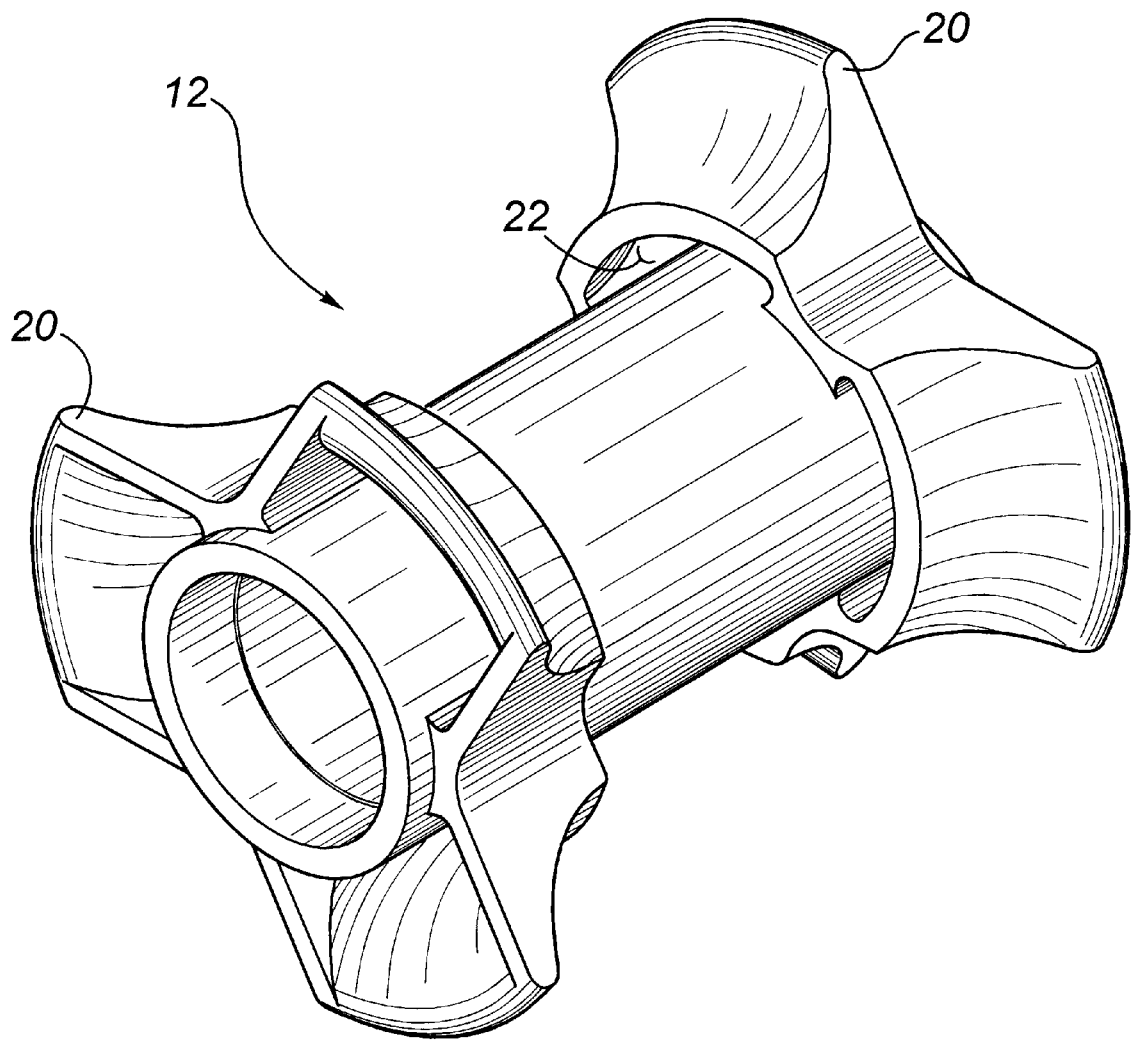
FIG. 2 is a perspective view of a hub used in the construction of the composite fiber spoke vehicular wheel illustrated in FIG. 1.
Figure 5:
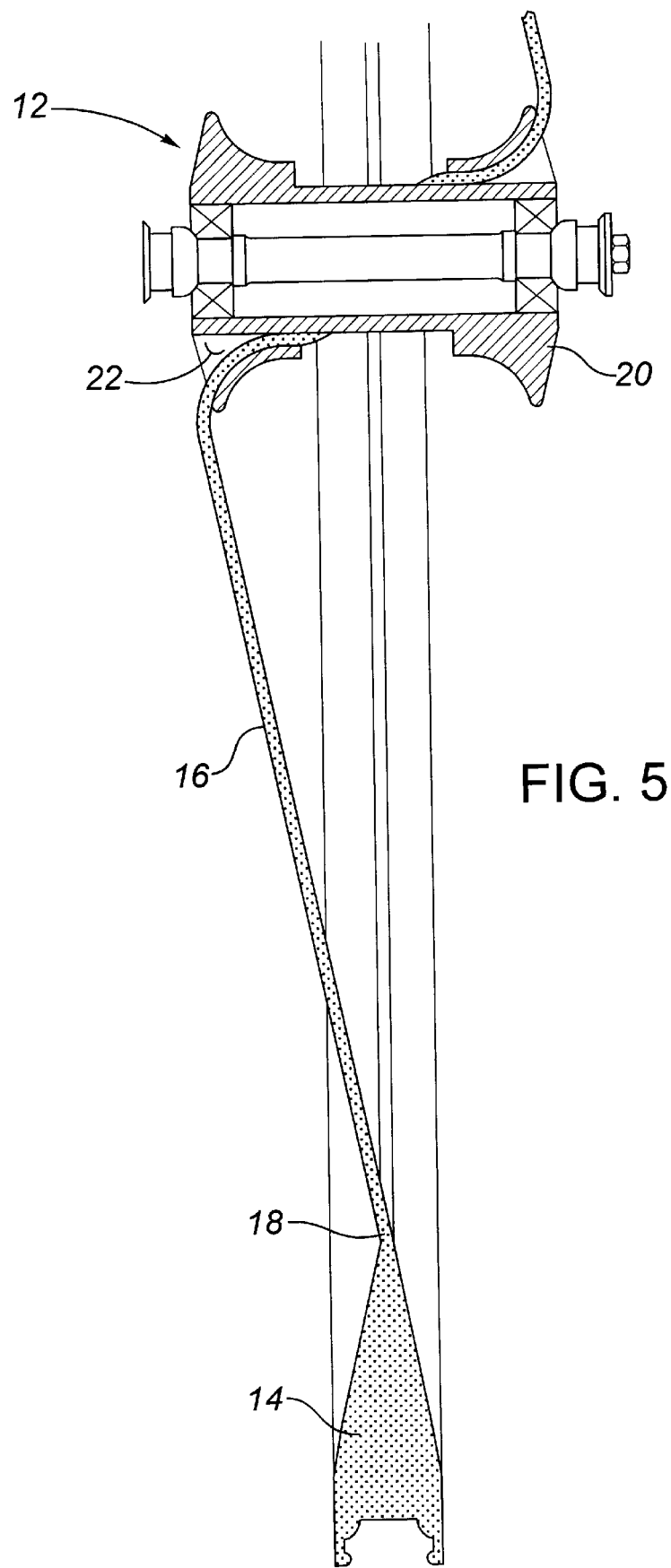
FIG. 5 is a top plan view, in section, of the composite fiber spoke vehicular wheel illustrated in FIG. 1.

The preferred method of making composite fiber spoke vehicular wheel 10, includes the following steps. Firstly, referring to FIG. 2, provide hub 12 having end flanges 20 a cylindrical central portion 19 and with a plurality of slots 22. Secondly, referring to FIG. 1, provide rim 14. Thirdly, provide some composite fiber strips 16. Composite fiber strips may either have their fibers oriented longitudinally or may be braided. It has been found that braided strips are to be preferred. When the fiber strips are braided they do not kink as they are wrapped around hub 12. The angle of the braid depends upon the strength requirements. When the fibers that make up the braid approach a 45 degree angle the braid has increased torsional strength. When the fibers that make up the braid approach a 30 degree angle, some torsional strength is sacrificed in favour of greater tensile strength. Each of strips 16 has opposed ends 18. Thirdly, weave each strip 16 through one of slots 22 and around a portion of hub 12, as best illustrated in FIG. 5. Secure opposed ends 18 of each strip 16 to rim 14. Fourthly, applying heat to cure composite fiber strips 16, whereby composite fiber strips 16 become spokes.

Figure 3:
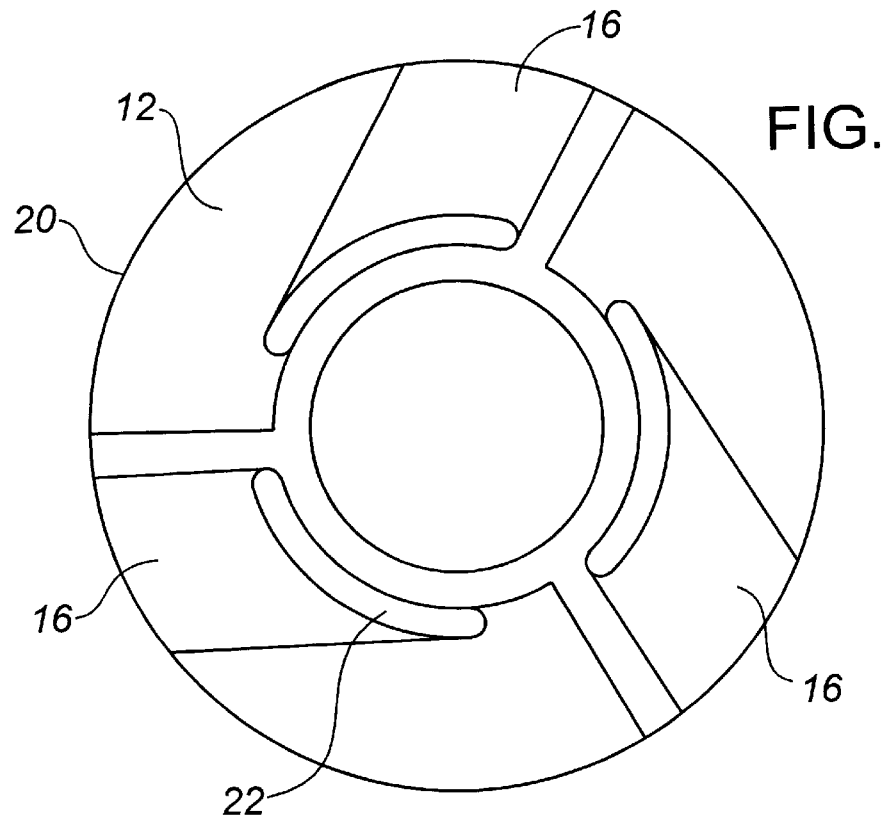
FIG. 3 is a detailed end elevation view of the hub illustrated in FIG. 2, with tangential composite fiber spokes.
Figure 4:
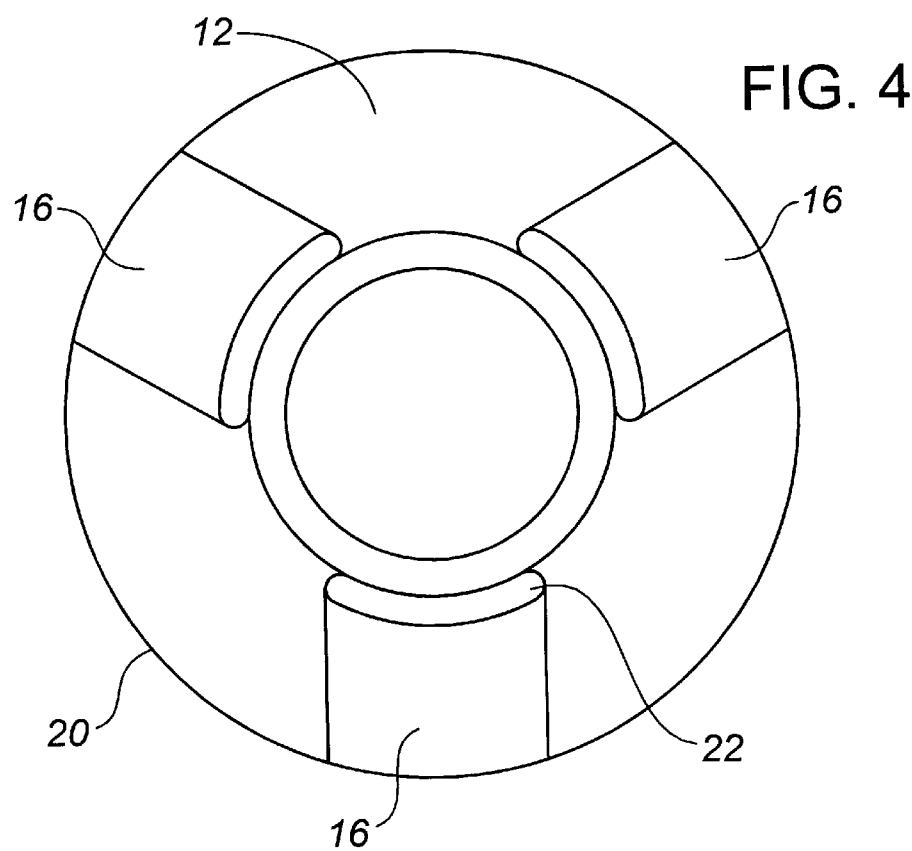
FIG. 4 is a detailed end elevation view of the hub illustrated in FIG. 2, with radial composite fiber spokes.

Composite fiber spokes 16 can extend either radially from hub 12 as illustrated in FIG. 4 or tangentially from hub 12, as illustrated in FIG. 3. It is preferred that both rim 14 and hub 12 be made of composite fiber.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method of making a composite fiber spoke vehicular wheel, comprising the steps of:

providing a hub;

providing a rim;

providing some composite fiber strips, each of the strips having opposed ends;

wrapping each strip around a portion of the hub and securing the opposed ends to the rim; and curing the composite fiber strips, whereby the fiber strips serve as spokes.

2. The method as defined in claim 1, the composite fiber strips having fibers that are oriented longitudinally.

3. The method as defined in claim 1, the composite fiber strips having fibers that are braided.

4. The method as defined in claim 1, the hub having a plurality of slots, the strips being extended through the slots to wrap around a portion of the hub.

5. The method as defined in claim 2, the hub having slotted end flanges.

6. The method as defined in claim 1, the strips extending radially from the hub.

7. The method as defined in claim 1, the strips extending tangentially from the hub.

8. The method as defined in claim 1, the rim and hub being made of composite fiber and resin.

9. A method of making a composite fiber spoke vehicular wheel, comprising the steps of:

providing a hub having end flanges with a plurality of slots;

providing a rim;

providing some composite fiber strips of braided fibers, each of the strips having opposed ends;

weaving each strip through one of the slots and around a portion of the hub and securing the opposed ends of each strip to the rim; and applying heat to cure the composite fiber strips, whereby the fiber strips become spokes.

10. The method as defined in claim 9, the strips extending radially from the hub.

11. The method as defined in claim 9, the strips extending tangentially from the hub.

12. The method as defined in claim 9, the rim and hub also being made of composite fiber.

* * * * *

UNITED STATES PATENT AND TRADEMARK OFFICE
CERTIFICATE OF CORRECTION

PATENT NO. : 5,915,796
DATED : June 29, 1999
INVENTOR(S) : Albert Arthur Beyer

It is certified that error appears in the above-indentified patent and that said Letters Patent is hereby corrected as shown below:

Drawing page 2 of 4, Figure 2 is amended to include numeral "19" between numerals 12 and 22.

Drawing page 4 of 4, Figure 5 is amended to include numeral "19" below numeral 20.

Column 2, lines 43 and 44, are amended to read "referring to Fig. 2, provide hub 12 having a cylindrical central portion 19 and end flanges 20 with a plurality of slots 22."

Signed and Sealed this

Twenty-sixth Day of December, 2000

Attest:

Q. TODD DICKINSON

Attesting Officer

Director of Patents and Trademarks